March 17, 1970 R. J. RUSSELL 3,500,794
PET DOOR
Filed June 5, 1968

Robert J. Russell
INVENTOR.

BY *Clarence A. O'Brien*
*and Harvey B. Jacobson*
Attorneys

United States Patent Office 3,500,794
Patented Mar. 17, 1970

3,500,794
PET DOOR
Robert J. Russell, 3708 Navajo St.,
Bakersfield, Calif. 93309
Filed June 5, 1968, Ser. No. 734,707
Int. Cl. A01k 15/00
U.S. Cl. 119—1  10 Claims

ABSTRACT OF THE DISCLOSURE

A hole in the bottom portion of a door or wall is lined with a collar and provides a passageway by way of which a pet can go outdoors and return when so desired. The collar has inward and outward positioning and retaining flanges. The outward flange is provided with an endless annulus V-shaped in cross-section which provides a seat for a closing and sealing weight (ball, pendulum-type bob or the like). The weight is suspended by adjustable hanger means, is acted on by the forces of gravity and momentum, is self-centering, automatically closes the outward end of the passage but can be actuated, after training, by the pet. A plate on the inward end of the passageway provides a manually controllable shutter.

---

This invention relates to pet doors such as are incorporated in a door or wall and has to do, more particularly, with a type of door which provides a hole or passage which enables a pet, a dog or cat for example, to tunnel outwardly and subsequently return at will and which is unique in that novel closures are provided at the inward and outward ends. To the ends desired, the outward closure is normally closed but is capable of being actuated by the pet and the inward closure is handled and taken care of, as desired, by the pet's owner.

Briefly, a hole of suitable size and shape is provided in the wall or door and is suitably protectively lined with a flanged collar. A closing weight, preferably a ball, or equivalent closure means is suspended on the outside of the door or wall by flexible suspension means such as a length of wire. This ball is centered in an appropriately constructed ball seating ring or annulus which fits the contour or periphery of the ball with requisite nicety. The suspension element is attached above the ball seating member and centered relative to the hole or passage and also in relation to the required center of gravity. The ball tension with respect to its seating member can be adjusted by moving the suspension screw-eye closer to or farther from the ball. As the pet leaves the ball rolls gently to one side or the other. It re-centers itself by the pendulum action of the ball returning to the center of gravity. When the pet enters the door from the outside no matter which side of the ball is touched, the ball will roll smoothly away. In fact, the pet can even touch the top of the ball and it will roll out of the way and then the hole is open for unhampered entry. The suspension element has a swivel attached to keep the element from twisting when the ball is rolled on entering or leaving and also has a small turnbuckle at the top for adjusting the length of the flexible element to correctly center the ball in the outer end of the hole.

In carrying out the principles of the invention the outer positioning and retaining flange and seating ring thereon can be made of plastic material which can be forcibly shoved outwardly through the hole in the door and permitted to expand and anchor itself in place. The seating member, which may be described as cupped, provides a weather-tight seal for the cooperating closing ball. As the wind blows toward the ball it is pressed more firmly against its seat. As a matter of fact it would take a strong wind blowing almost at right angles to the ball to dislodge it from its seat. For more effective control purposes the inner flange is provided with guide tracks to accommodate an attachable and detachable plate which can be slid in the tracks and which blocks the inward end of the passage and provides an optional occupant controlled shutter.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
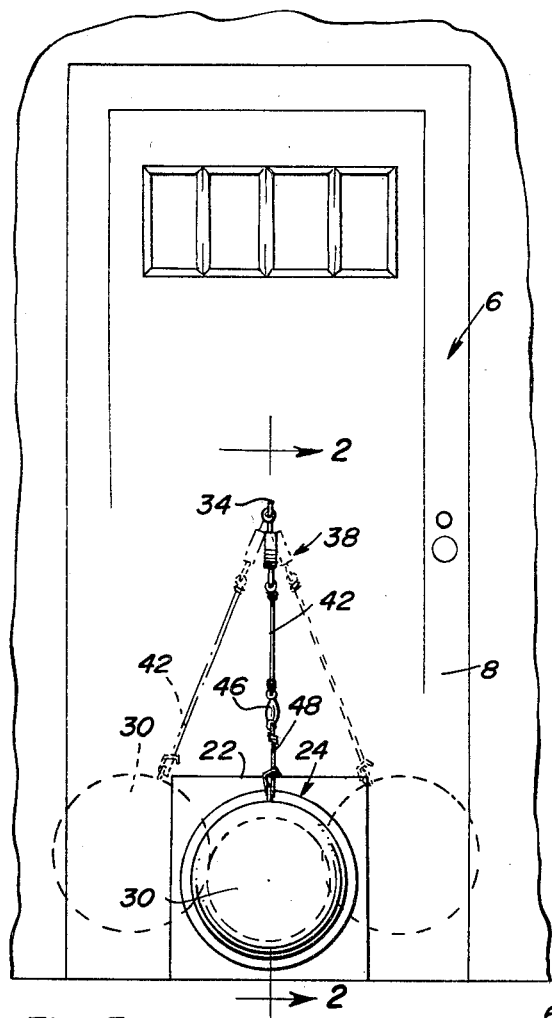
FIG. 1 is an elevational view of a door of a conventional type but which is modified at the bottom thereof to include the aforementioned pet door and which shows the ball-type closing weight seated in closed position in full line and swung from left to right in phantom lines to assume open or out-of-the-way positions.
Figure 2:
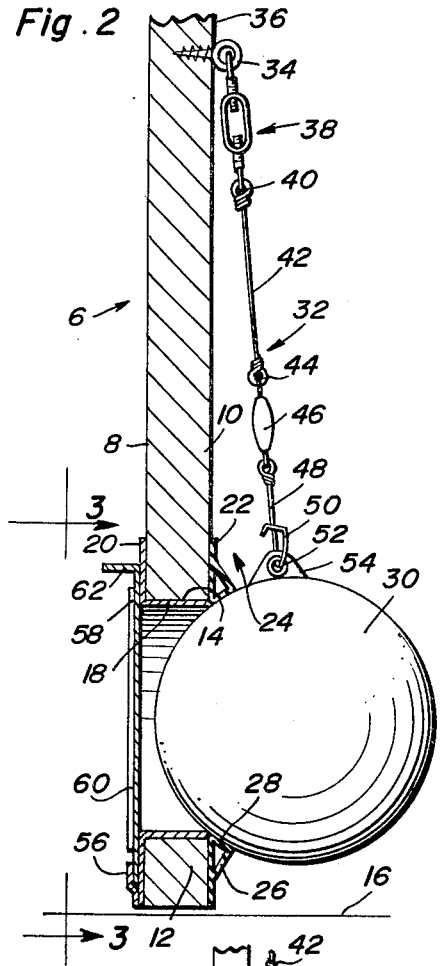
FIG. 2 is an enlarged fragmentary view with parts in section and elevation taken approximately on the plane of the vertical section line 2—2 of FIG. 1.
Figure 4:
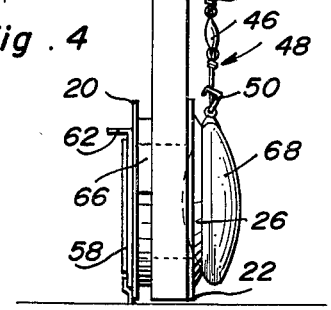
FIG. 4 is a reduced view in edge elevation showing the door and pet door with slight modifications where, for example, a door of relatively thin cross-section serves to accommodate the pet door when a space take-up shim or filler is used.
Figure 3:
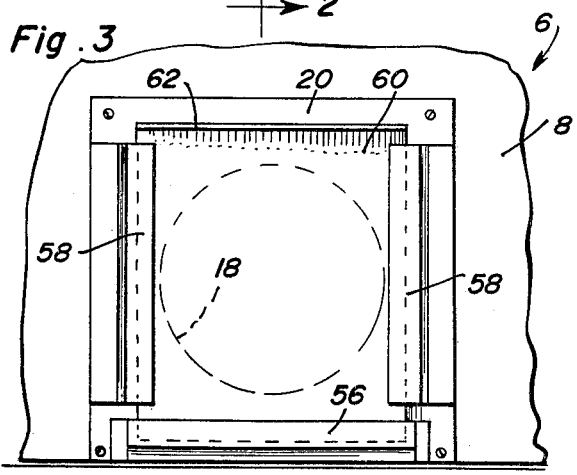
FIG. 3 is also a fragmentary inside elevational view observing the aforementioned closing shutter and which is taken approximately on the plane of the vertical line 3—3 of FIG. 2.

By way of introduction to the description of the details it is to be pointed out that the essence of the invention is shown in FIGS. 1 to 3 inclusive and that the slight modification in FIG. 4 is basically the same in construction but will be described separately. With respect to FIGS. 1 to 3 the numeral 6 designates a door in which the improved pet door is incorporated. Manifestly, the word "door" is used here advisedly inasmuch as it would be possible to build a pet door into a wall (not shown) if desired. The interior side of the door is denoted at 8 in FIG. 2, the exterior side at 10 and the lower portion at 12. This portion is mentioned for the reason that the hole 14 in the door is necessarily at a proper elevation above the level of the floor 16 depending, of course, on the size of the pet which has to use the unique door. While the hole can be of whatever shape desired it is customarily circular and serves to accommodate a correspondingly shaped and proportioned adapter which is characterized by a collar 18 which is fitted into the hole. It is within the purview of the invention to provide a collar at both ends with flexible flanges. On the other hand it is perhaps more desirable to provide a rigid outstanding flange 20 on the inside which abuts the door surface 8 as brought out in FIG. 2. The companion positioning of the retaining flange 22 at the other end can preferably be flexible plastic material which is capable of being deformed and forced to press from left to right through the hole. The exterior surface of this adaptable flange 22 is provided with an annulus for a ring-like seating member which is denoted generally by the numeral 24 and which has an outer bevelled flange 26 and an inner suitably concaved flange 28 which provides a satisfactory seating member for the pendulum type closing member which in these figures comprises a weighted ball 30 of appropriate dimension and which is self-seating and self-centering and normally occupies the closed position shown in FIGS. 1 and 2. The means for hanging and positioning the ball is referred to broadly as suspension means 32 and as shown in FIG. 2 it comprises, starting at the top, a screw-eye 34 fastened in the door surface at the point designated at 36. This screw-eye serves to accommodatingly support a turnbuckle 38 whose lower end is attached to an eye 40 at the upper end of a wire (chain or the like)

42. The lower end 44 is attached to an eye carried by the swivel 46 which in turn is connected at its lower end to a wire or an equivalent connector 48 having a resilient hook 50 engaging in a grommet 52 provided in an attaching ear 54 on the top surface of the aforementioned ball weight 30. With this construction the swivel permits the ball to roll in whatever direction needed or desired. The turnbuckle 38 is used to raise or lower the ball so as to center it in the hole for a perfect weather tight seal. This does not apply additional ball pressure. The ball pressure in relation to the seat is done by suspending the ball closer to the hole which increases the pressure. The farther above the center of the hole the ball is suspended the less pressure is applied to the ball seat and the easier it is to operate.

The closure means on the inner side comprises several suitable guide tracks 56 and 58 which are in a common plane and carried by the inward flange means 20 and which are arranged to provide a pocket-like receiver for the bodily insertable and removable plate or panel 60. This has a handling flange 62 at the upper end. This plate provides a shutter whereby the pet owner can close the passageway at will.

The aforementioned flanges may be molded as one flexible unit and collapsed and then slipped into the round or square hole in the door and released with the flange on each side of the hole. If and when the door is thin as suggested in FIG. 4 at 64 it would then be necessary to provide spacing means or shims as at 66. Insofar as the flanged collar is concerned and used as a liner for the hole it is the same as already described and therefore the same reference numerals apply. This showing in FIG. 4 also brings out the fact that it is within the purview of the invention to substitute a discoidal pendulum bob 68 for the ball if desired. The convex seating surface is equivalent to that already described and therefore the weighted closure can be of either shape shown in FIG. 2 or FIG. 4 as desired.

Experience has shown that the invention is such that it provides a satisfactory weather-tight seal. It is easy to install and enables the user to train the pet step-by-step in a manner to use the door. To be sure, the self-centering and sealing features resulting from the pendulum action and the forces of gravity and silent operation and adjustment features are worthy of consideration. There is no rubbing on the pet. The ball rolls on the pet's body. It is likewise true that this pendulum type of pet actuated door or closure is entertaining for the pet owner and members of the family and also is pleasing to the pet by reason of the fact that it is so easily nudged and otherwise shoved and manipulated to let the pet in or out as desired. It follows that the invention well serves the purposes for which it has been devised and successfully used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. In combination, a door, wall or the like having an open-ended passageway of a predetermined shape, cross-sectional dimension and length by way of which a pet, a dog or cat for example, can pass outwardly from a room or an equivalent indoors locality to an adjacent outdoors locality such as a porch, yard or the like and can subsequently return indoors, and self-contained pet actuated means providing an automatic closure for the outward end of said passageway, said means constituting a gravity held closure and being free of positive mechanical connection with said passageway and being hung and suspended from said door in said passageway.

2. The combination defined in and according to claim 1, and wherein said means is pendulum-like in construction and is wholly and accessibly mounted on an exterior surface of said door.

3. The combination defined in and according to claim 2, and wherein manually applicable and removable shutter means is cooperatively associated with the inner end of said passageway and is usable at will and according to the discretion of the pet's owner and accordingly permits the owner to block and shut said inner end whenever necessary or desired.

4. The combination defined in and according to claim 2, and wherein the marginal surface of said passageway is lined with a collar, said collar fitted conformingly into said passageway and having inward and outward lateral outstanding collar locating and retaining flanges retentively cooperable with inward and outward surfaces of said door, that is, surfaces immediately encircling the respective inward and outward end portions of said passageway.

5. The combination defined in and according to claim 1, and wherein said means comprises a pendulum structure embodying a dangling weight which is acted on by the force of gravity and momentum to swing toward and from the outward end of said passageway and is self-centering and automatically seatable in a manner to normally close said outward end, a flexible suspension element including a complemental turnbuckle and having an upper end operatively secured to the outer surface of said door at an elevation above an underlying locale of said upper end, clip means connected to an upper portion of said weight, and a swivel connecting said clip means to a lower end of said flexible suspension element.

6. The combination defined in and according to claim 5, and wherein manually applicable and removable shutter means is cooperatively associated with the inner end of said passageway and is usable at will and according to the discretion of the pet's owner and accordingly permits the owner to block and shut said inner end whenever necessary or desired.

7. The combination defined in and according to claim 6, and wherein the marginal surface of said passageway is lined with a collar, said collar fitted conformingly into said passageway and having inward and outward lateral outstanding collar locating and retaining flanges retentively cooperable with inward and outward surfaces of said door, that is, surfaces immediately encircling the respective inward and outward end portions of said passageway.

8. In combination, a door having a lower portion provided with a hole which opens through inward and outward surfaces, said hole being of a prescribed shape, size and length and providing a passageway for a dog, cat or a household pet and permitting said pet to pass outwardly and return inwardly at will, a collar fitted into and lining said hole, said collar being provided on an inward end with a first lateral outstanding flange capable of abutting an interior door surface surrounding said hole, said collar being also provided on its outward end with a second lateral flange abutting the exterior door surface and also surrounding said hole, said second flange being flexible and yieldable and of a diameter that it can be temporarily deformed and forcibly pushed outwardly through said hole after which it expands and automatically resumes a given shape and stays put against the door surface which it abuts, said second flange having an exterior surface provided with an integral but flexible endless annulus which is substantially V-shaped in cross-section and which constitutes a seat, said annulus being of an inside diameter corresponding to the diameter of said hole, and pet actuated gravity urged freely suspended closing means cooperable with said annulus.

9. The combination defined in and according to claim 8, and wherein said means comprises a pendulum structure embodying a dangling weight which is acted on by the forces of gravity and momentum to swing toward and from the outward end of said passageway and is self-centering and automatically seatable in a manner to normally close said outward end, a flexible suspension element provided with a companion turnbuckle having an upper end operatively secured to the outer surface of said door at an elevation above an underlying locale of said upper end, clip means connected to an upper portion of said weight, and a swivel connecting said clip means to a lower end of said flexible suspension element.

10. The combination defined in and according to claim 9, and wherein the interior surface of said first flange is provided with coplanar coordinating fixed guide tracks, and an insertable and removable plate providing a shutter and slidably mounted in said tracks and usable at will by the pet's owner to span and close the inward end of said passageway.

References Cited
UNITED STATES PATENTS

| | | | |
|---|---|---|---|
| 775,798 | 11/1904 | Chase | 49—171 X |
| 1,186,566 | 6/1916 | Fogg | 49—171 X |
| 2,304,995 | 12/1942 | Frankel | 49—171 |
| 2,560,661 | 7/1951 | Poovey | 160—179 |
| 2,758,646 | 8/1956 | Johnson | 160—354 |
| 3,391,674 | 7/1968 | Burleigh | 119—29 |

ALDRICH F. MEDBERY, Primary Examiner

U.S. Cl. X.R.

49—171